June 21, 1932. W. C. WYLAND 1,864,034
EGG CANDLING MACHINE
Filed April 17, 1930 4 Sheets-Sheet 1
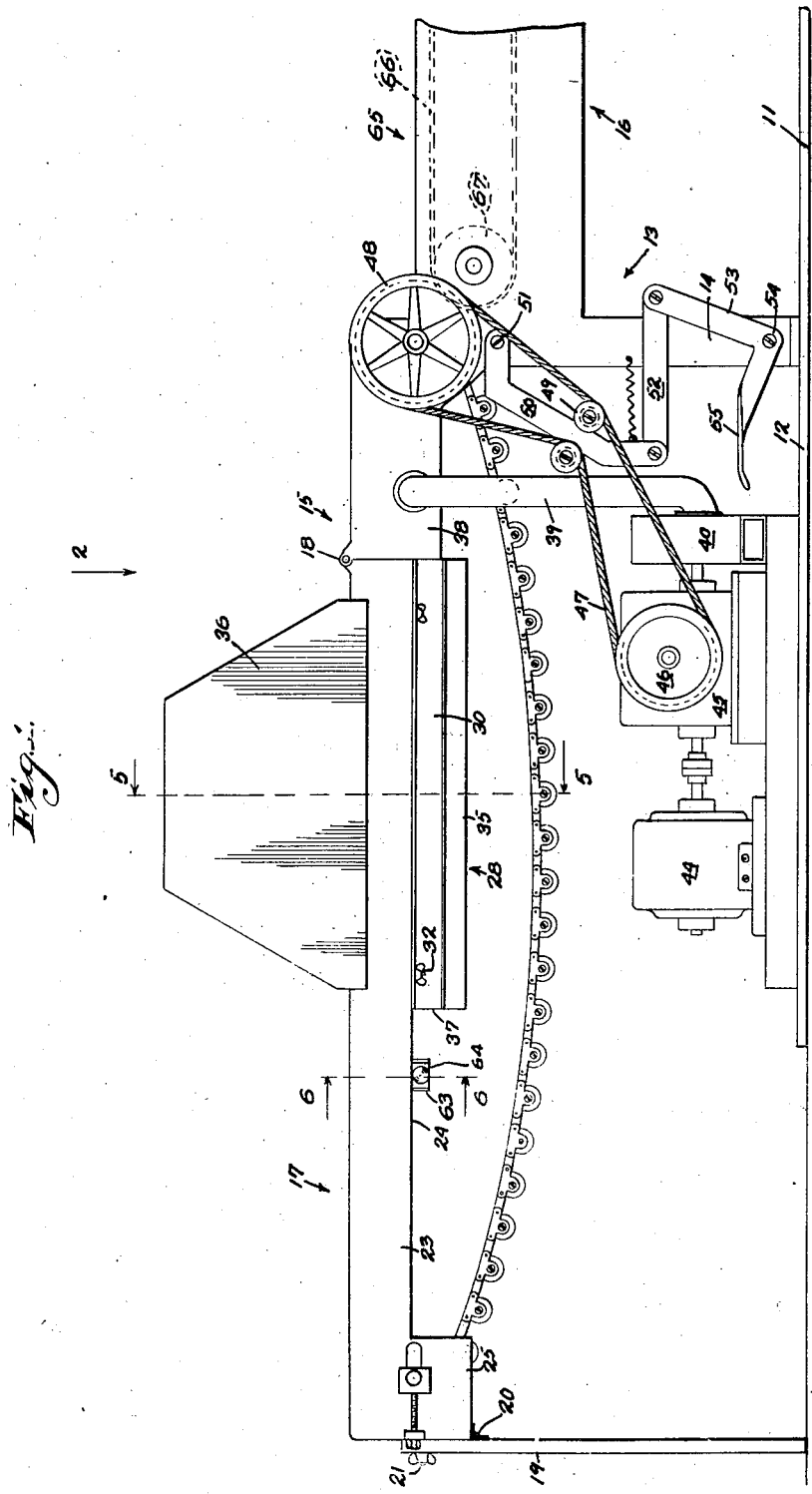
Inventor
William C. Wyland.
by Hazard and
Miller
Attorneys June 21, 1932.  W. C. WYLAND  1,864,034
EGG CANDLING MACHINE
Filed April 17, 1930  4 Sheets-Sheet 2
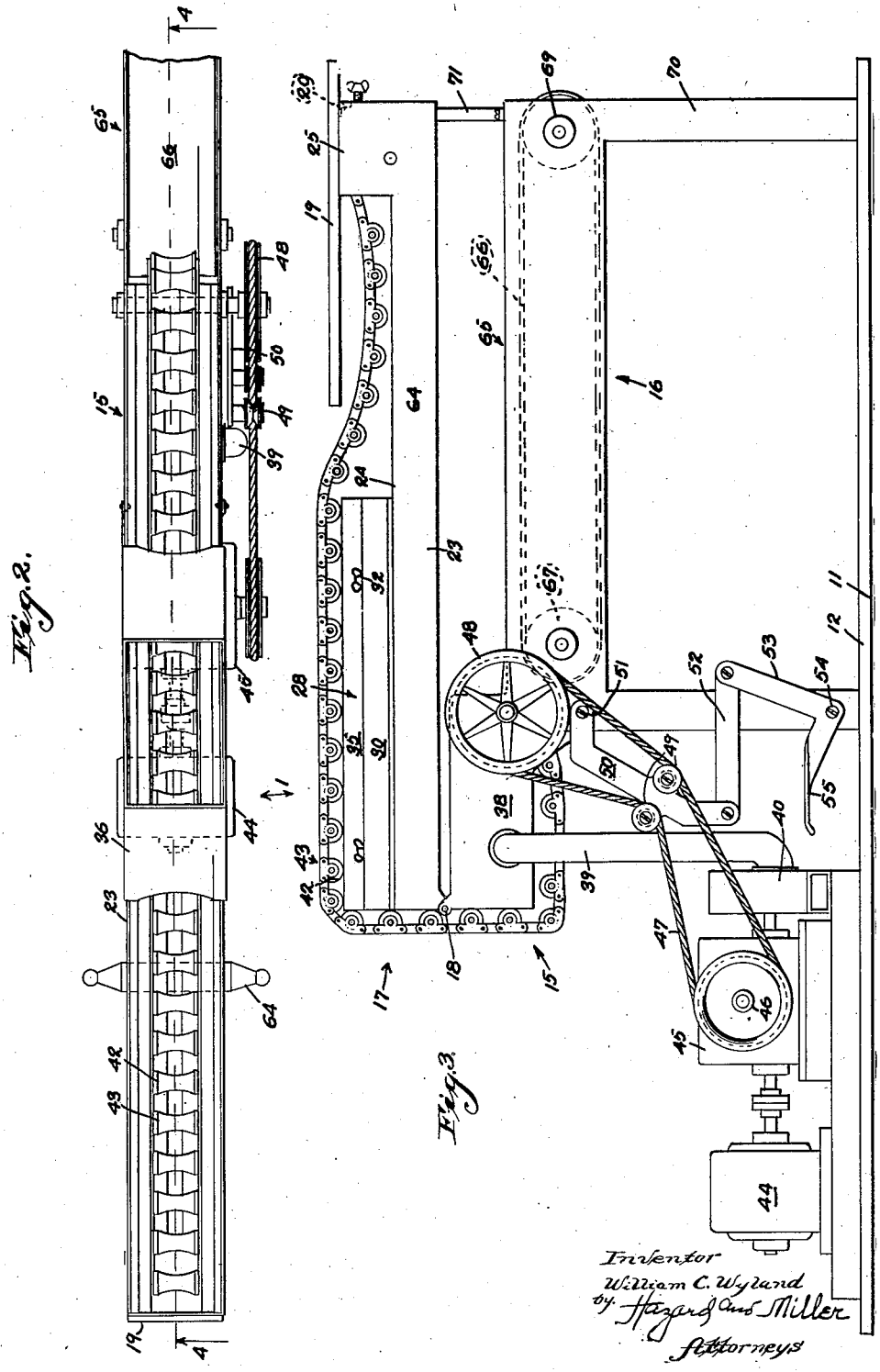

June 21, 1932.  W. C. WYLAND  1,864,034
EGG CANDLING MACHINE
Filed April 17, 1930   4 Sheets-Sheet 3
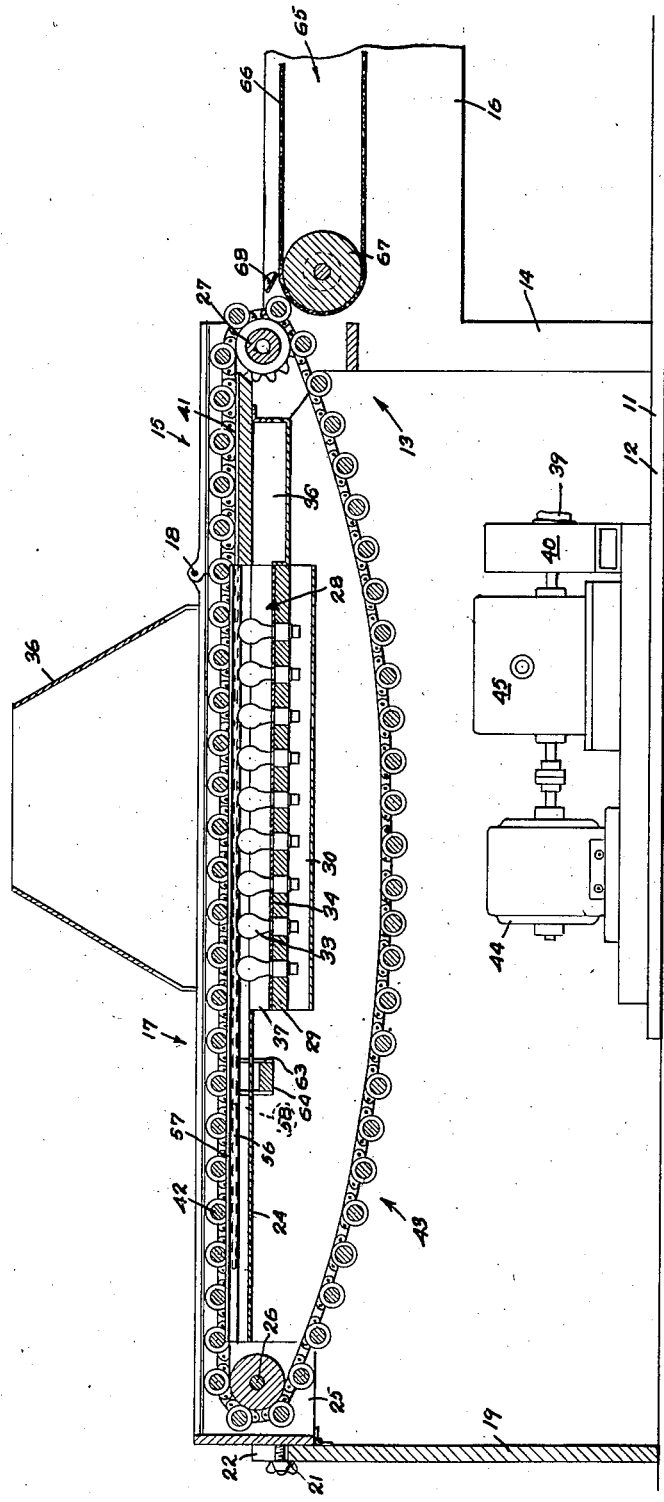

June 21, 1932.  W. C. WYLAND  1,864,034
EGG CANDLING MACHINE
Filed April 17, 1930  4 Sheets-Sheet 4

Inventor
William C. Wyland
by Hazard and Miller
Attorneys

Patented June 21, 1932

1,864,034

UNITED STATES PATENT OFFICE

WILLIAM C. WYLAND, OF SAN GABRIEL, CALIFORNIA

EGG CANDLING MACHINE

Application filed April 17, 1930. Serial No. 445,129.

The egg candling machine to which my invention pertains embodies an endless chain having rollers, and these rollers rotate the eggs as they pass over a source of light which is used in the candling operation. The invention pertains somewhat to the type of machines as disclosed in application Serial No. 133,885, filed September 7, 1926 by John W. Wyland, for an egg tester, and in U. S. Patent No. 1,728,462, dated September 17, 1929, obtained by John W. Wyland for an egg tester.

In egg candling machines, it has been desirable to readily control the feeding of the eggs, so that the operator may more clearly make an examination to determine the quality, and to effect this I have a clutch arrangement with a conveniently situated device to operate the same, so that the feeding of the eggs may be stopped or slowed up from the normal speed at any time.

Again, at other times it is desirable, while the eggs are being fed, to stop their rotation so that the operator may more carefully examine the eggs which are over the lamps. Therefore, a feature of my invention is a construction by which the rollers which feed and rotate the eggs over the candling lamps may be stopped in rotation, or if desired, rotated in the opposite direction, or at a higher rate of speed than that due to the normal rotation of the rollers, and to effect this I utilize sliding tracks which may be manipulated by hand and slid underneath the rollers, and manifestly while the track is sliding at the same rate as the rollers, the rollers are held stationary, or if the track is moved faster than the rollers, the rollers will be rotated backwards, and on the quick return of the track, the rollers may be rotated at a speed higher than their normal.

In egg testing or candling machines, it is frequently desirable to have the machine conveniently arranged for transporting from place to place, and to attach the candling machine to various other machines, such as egg sizers, or other appliances for handling eggs. To effect this, I provide the egg candling machine with a feeding table, including the candling lamps, which is formed in two parts hinged together, and which when extended forms a complete table, and in which one part may be folded over the other part.

Another detail feature of my invention comprises a ventilating arrangement for drawing the hot air generated by the bank of lamps away from the portion of the machine having the light source.

My invention is illustrated in connection with the accompanying drawings, in which:

Fig. 1 is a side elevation of my machine in the operative position, taken in the direction of the arrow 1 of Fig. 2;

Fig. 2 is a plan view taken in the direction of the arrow 2 of Fig. 1;

Fig. 3 is a side elevation with one section of the machine folded over the other section;

Fig. 4 is a longitudinal section taken substantially on the line 4—4 of Fig. 2 in the direction of the arrows;

Figure 5:
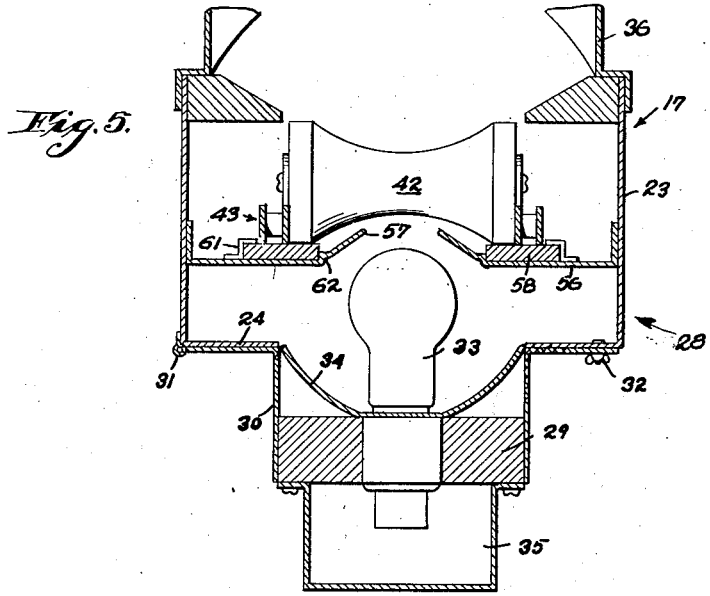
Fig. 5 is a transverse, vertical section on the line 5—5 of Fig. 1 in the direction of the arrows through the lamp housing.
Figure 6:
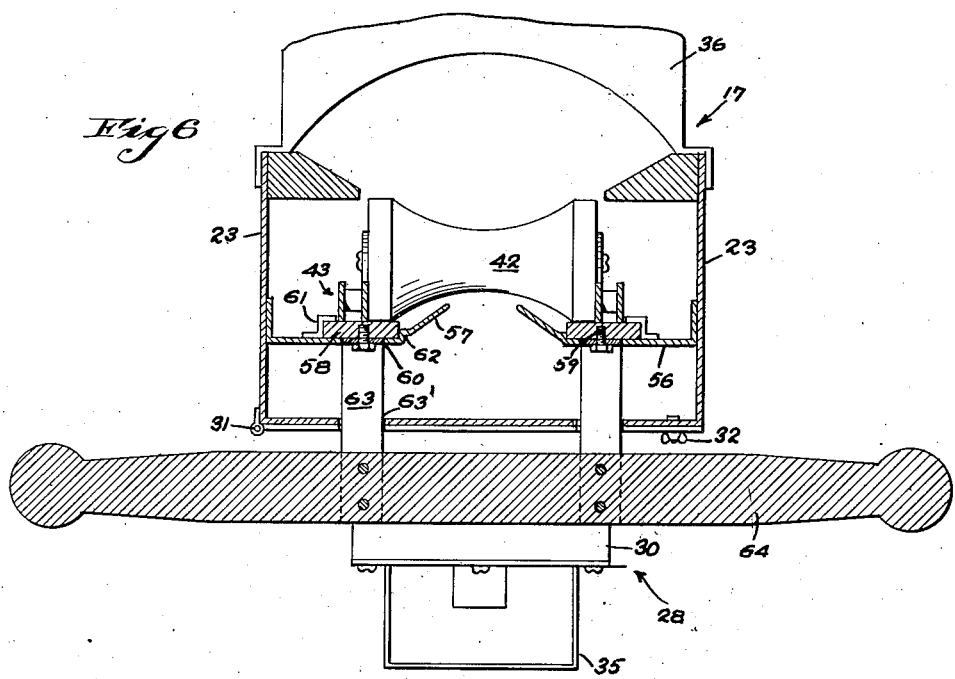
Fig. 6 is a vertical, transverse section on the line 6—6 of Fig. 1, in the direction of the arrows.

In the accompanying drawings, the floor level is indicated by the numeral 11, on which there is placed a substantial, flat base 12 which may be formed of wood, and connected to this there is a frame 13 having substantial legs 14 and a horizontal framing 15 extending laterally from the legs in one direction, and a second framing 16 extending in the opposite direction. A third frame 17 is connected to the frame 15 by hinges 18, and at the end of the frame 17 there is a hinged leg 19 having a hinge 20 with a bolt 21 engaging in a slot 22 in the leg, the bolt retaining the leg in vertical position.

The frame 17 is formed of trough-like structures having side walls or members 23 and a base 24. This makes a closed structure. At the outer end the side walls have a downward extension 25, and a roller 26 is journalled between the side members. At the opposite end a sprocket wheel 27 is journalled at the upper portion of the leg structure 14. The light box designated generally by the numeral 28 comprises a socket holding plate 29 which is mounted in a box structure 30, this box structure having a hinge 31 connecting it to one of the side walls of the channel structure, and having a locking bolt 32 retaining the lamp box on the other side of the channel structure. A series of lamps 33 are mounted on individual sockets, and there is a reflector 34 reflecting the light upwardly. A trough 35 is positioned below the lamp sockets, and may accommodate the wiring or afford ventilation. A cover hood 36 is provided over the lamps and is removably connected to the side walls 23 for purposes of observation of the eggs passing over the lamp box. The box structure having the lamps is open at the end 37, and at the opposite end there is an air suction box 38 which is connected by a suction pipe 39 with a blower 40 operated in the manner hereinunder detailed.

The channel box frames 15 and 17 are provided with fixed tracks 41 over which may operate the rollers 42 of an endless chain 43. This chain passes over the driven sprocket 27 and the idler roller 26, so that its upper run passes over the bank of lamps, and its lower run is suspended below the lamps. The chain is driven preferably by an electric motor 44 which connects to a gear box 45, and also from this gear box the blower 40 is operated. A pulley 46 is driven from the drive chain in the gear box and by a belt 47 operates a driven pulley 48, which pulley is mounted on the shaft having the sprocket 27.

A clutch arrangement is formed by having a pair of idler rollers 49 which are mounted on a pivoted lever 50, this lever being pivoted as indicated at 51, and which lever is operated by means of a link 52 connected to a pedal operated bell crank 53 pivoted at 54 and having a foot pedal 55. This foot pedal is placed at a convenient location for the operator who is observing the passage of the eggs for candling purposes, and who by operating the foot pedal may slacken the belt and thus stop the drive of the chain, or he may allow the belt to slip, and thus vary the speed of driving the roller chain. The eggs are placed on the machine in any suitable manner at the left hand end as shown in Figs. 1, 2 and 4, and thence towards the right hand end.

The mechanism for stopping the rotation of the eggs is as follows. Above the lamp box and extending forwardly therefrom, there are shelves 56 extending inwardly from opposite sides of the side walls of the machine. These have inwardly and upwardly turned ends 57. A pair of sliding tracks or rails 58 are fitted on these shelves, each having a guide pin 59 connected thereto extending through a longitudinal slot 60 in each of the shelves. These tracks are retained in position longitudinally by Z bars 61 on the outside and by a shoulder 62 on the inside of the shelves adjacent the portion 57. A pair of bars 63 are rigidly connected to the end part of the rails 58 and extend downwardly through longitudinal slots 63' in the bottom plate 24 of the frames forming the track forward of the light box, and these bars 63 have a handle 64 rigidly attached thereto, the handle extending upwardly on opposite sides of the machine.

In the usual operation of the machine, the endless roller chain is fed in its directional movement at a constant rate of speed, which, however, as above mentioned, may be varied by use of the clutch mechanism on the drive belt, and if the operator wishes to cause the eggs he is observing to remain stationary, he may advance the tracks 58 by means of the handle 64 at the same rate at which the rollers are moving in a forward direction, which action will manifestly prevent rotation of the rollers and hold the eggs stationary. Also, it is quite obvious that if desired the operator may advance the track at a slightly slower speed than the rollers, and thus retard the rotation of the eggs. When the sliding tracks have reached their limit of movement, manifestly such tracks must be returned for a second operation, and in returning the tracks, the rollers are caused to rotate at a higher rate of speed, and thus rotate the eggs at a faster rate of speed. This is frequently of use to the operator in properly grading the eggs.

The candling machine is illustrated as having an out-feeding table mounted on the framing 16 and designated generally by the numeral 65. This has an endless belt 66 operating over rollers 67. There is a bridging piece 68 to catch the eggs dropping from the roller conveyor on to the endless belt 66, and this belt passes over a drum 69 held at the opposite end of the out-feeding part of the machine, which end is supported on legs 70. (Note particularly Fig. 3). This portion of the machine is supported on the base 12, and the out-feeding belt is driven by the machine to which the egg candler is connected, or the belt 66 may be driven in any other suitable manner.

The folding arrangement is effected by having the hinges 18 constructed on the side walls 23 of the channel structures, and after the hood 36 is removed, the in-feed end of the egg candler may be tilted upwardly and shifted from the positions shown in Figs. 1, 2 and 4 to the position shown in Fig. 3, in which it will be noted that the leg 19 is folded on the upper part of the machine, and the outer end of the frame is supported by posts 71 from the end of the out-feeding frame above the legs 70. In the arrangement shown, there must be sufficient slack allowed in the endless roller chain so that this may be folded double on itself without binding. When the machine is thus folded it affords a convenient arrangement for shipping, and manifestly, if desired the electric motor and gear box with the blower may be dismounted from the base, or may be located on a separate base.

It will be seen, therefore, by the above described construction, that I have provided in an egg testing or candling machine a simple arrangement for varying the speed of the eggs, for stopping the rotation, and for controlling the rate of rotation of the eggs by the manual operation of the control handle 64, by which the eggs may be stopped in rotation or rotated slowly so that the operator may more carefully observe their condition. An efficient arrangement is provided for ventilating the lamp box so that a great deal of heat is not directed upwardly to the observer.

With my arrangement of rolling the eggs and then being able by the shifting tracks to roll these at a higher speed or to stop the rotation or, in fact, reverse the rotation, the eggs are allowed to be candled very much in the same manner as is sometimes done by hand, in which the egg may be spun in the hand. The rotating or spinning of the egg by turning the shell causes the inside or the fluid filling of the egg to rotate and when the rotation of the shell is stopped the inside filling continues its rotation and thus the imperfections such as blood spots, worms, etc., are readily indicated. It will hence be seen that the operator can thus readily control the spinning of the inside contents of the egg independently of the spinning or rotation of the shell.

Various changes may be made in the details of construction without departing from the spirit or scope of the invention as defined by the appended claims.

I claim:

1. A candling machine having an endless chain with rollers thereon, a source of light below the rollers, a track structure to engage the rollers to cause rotation thereof, and means to shift part of the track structure to stop or change the rotation of the rollers.

2. A candling machine having an endless chain with rotatable rollers thereon, a source of light positioned below the upper run of the rollers, a track to engage the rollers to cause rotation thereof, and means to slide a portion of the track over the source of light whereby the rotation of the rollers may be stopped, or the speed of such rotation changed.

3. A candling machine having a frame work with a trough structure having tracks therein, an endless chain having rotatable rollers to engage the track, and means to slide said track longitudinally to stop or change the speed of rotation of the rollers.

4. In an egg candling machine, an endless chain having rotatable rollers, a track structure to engage the opposite ends of the rollers to rotate same, and means to slide said track to stop or change the speed of the rotation of the said rollers.

5. In an egg candling machine having an endless chain with rotatable rollers thereon, a source of light positioned below the upper run of said rollers, a track structure to engage the opposite ends of the rollers adjacent the source of light, and means to slide said track structure to stop or change the speed of rotation of the rollers.

6. An egg candling machine having a trough like frame structure with the upper run of an endless chain having rotatable rollers passing therethrough, a pair of parallel track rails slidably mounted in the trough structure to engage opposite ends of the rollers, the rollers rotating over the said track, a handle device located outside of the trough structure with a connection between the handle to the tracks to slide the said tracks, and thereby stop or change the speed of rotation of the rollers.

7. An egg candling machine having a frame structure in the form of a trough with the upper run of an endless chain having rotatable rollers passing therethrough, a shelf in the trough structure having a pair of track rails engaging opposite ends of the rollers, the rollers rotating on the track, the trough structure having slots therein and bars extending from the tracks through the said slots with a handle on the outside of the trough structure attached to the bars to slide the tracks and thereby stop or change the speed of the rotation of the rollers.

8. An egg candling machine comprising in combination a trough shaped structure, an endless chain having rotatable rollers thereon and with its upper run extending through the said trough structure, a bank of lamps mounted in the trough structure, a pair of shelves in the trough structure and attached thereto with a longitudinal opening between the shelves over the lamps, a track rail on each shelf, means forming a guide for each track, and a connection from the track to a position below the trough structure to slide in the said track, the rollers bearing on the track thereby stopping or changing the speed of rotation of the rollers.

9. An egg candling machine having a trough shaped structure with the upper run of an endless chain extending therethrough, said chain having rotatable rollers thereon, a box structure having a hinged connection to the under side of the trough structure and having a bank of lamps therein, a longitudinal shelf secured to each side of the trough structure above the box having the lights, there being an opening between the shelves to expose the lights, a track slidable on each shelf, means forming a guide for each track, the rollers bearing on the track, a bar extending downwardly from each track, there being slots in the shelf and in the lower part of the trough structure to accommodate said bars, and a transverse handle connected to the bars and operable from either side of the trough structure to slide the said tracks longitudinally and thereby stop or change the speed of rotation of the rollers.

10. An egg candling machine as claimed in claim 9, an air suction box located underneath the trough structure and adjacent the light box, and a suction device to create a suction of air through the lamp box and the suction box.

11. An egg candling machine having a horizontal framing in two parts and having a hinged connection, an endless driven chain having its upper run passing through the said structure and with rollers thereon, a track structure engaging the rollers to cause their rotation, a source of light below the upper run of the chain, the said frame being foldable to a position with the one section of the frame bearing on the other.

12. An egg candling machine having a frame in the form of a trough shaped structure in two parts and hinged together, an endless chain having its upper run extending through the trough structure and with rollers thereon, a track to rotate the rollers, means to drive the chain, a lamp box having lamps therein positioned below the upper run of the chain, the said trough structure being foldable with one section and part of the endless chain located above another part.

13. A candling machine comprising in combination a frame structure having side members with a track structure therein, the said side members being divided longitudinally and having a transverse hinged connection, one part being relatively stationary and having a drive connection, an endless chain passing over said drive connection and having its upper run extending between the side members and having rollers thereon to engage the tracks, a lamp box attached to a movable section of the side members, said movable section with the track and part of the chain being foldable over the relatively stationary section having the drive connection.

14. In an egg candling machine having a frame work with the upper run of an endless chain passing therethrough, having rollers thereon, with a source of light positioned below the said upper run, a source of power, a drive connection for the chain, a foot pedal postioned adjacent the frame and having a clutch connection between the source of power and the drive connection.

15. An egg candling machine having a frame work, an endless chain mounted therein and having rollers, a lamp box, the upper run of the chain passing above the lamp box, a source of power, a drive connection for the chain, a belt between the source of power and the drive connection, a pivotally mounted foot pedal, idlers connected to the pedal and to the belt to loosen or tighten the belt and thereby control the movement of the chain.

16. An egg candling machine having a first frame with a stationary and a movable section, with a hinged connection, with an endless chain having rotatable rollers with the upper run travelling in substantially a horizontal plane through the said frame, a second frame having an out-feeding belt conveyor connected to the stationary section of the first frame, the movable section of the first frame being adapted to be turned by the hinged connection over the second frame having the out-feeding conveyor.

17. An egg candling machine having means to move eggs with a motion of translation between a source of light and an observer, with means to rotate the eggs while undergoing the movement of translation, and means to at will stop or slow the speed of rotation of the eggs while continuing the motion of translation.

18. An egg candling machine having a rotatable means for conveying eggs with a motion of translation between a source of light and an observer, such rotatable means rotating the eggs, and means controllable by the observer to stop the rotation of certain of the rotatable means or to lessen the speed of such rotation while continuing the motion of translation.

19. An egg candling machine having a plurality of rotatable rollers, means to move said rollers bodily with a motion of translation between a source of light and an observer, and means operable by the observer for stopping the rotation of certain of the rollers or lessening the speed of such rotation without changing the speed of the motion of translation.

20. An egg candling machine having means to roll eggs and at the same time convey the eggs with a motion of translation between a source of light and an observer, and a control means for stopping the rolling of certain of the eggs without changing the motion of translation.

21. An egg candling machine having means to roll eggs between a source of light and an observer, and a controllable means to stop the rotation of some of the eggs and slide said eggs between the source of light and the observer.

22. An egg candling machine having a plurality of rollers, means to roll said rollers between a source of light and an observer, adjacent rollers being adapted to support and to rotate eggs, and a controllable means to slide one or more of the rollers while maintaining the motion of translation.

23. An egg candling machine having a horizontal framing in two parts having a transverse hinged connection, a conveyor operating through the horizontal framing and past the hinged connection, said conveyor being adapted to convey eggs, a source of light positioned at one side of the framing to project light through the conveyor, said frame being foldable at the hinged connection whereby one part may be folded over the other, said conveyor folding with the framing.

24. An egg candling machine having a frame in the form of a trough-shaped structure in two parts having a transverse hinge located at the upper part of the trough structure, an endless chain having its upper run extending through the trough structure and with rollers thereon adapted to convey eggs, means to rotate said rollers, a lamp box positioned on one side of the upper run of the rollers to project light therethrough, said trough structure being foldable at the hinged connection to fold one part over the other with the upper surfaces of the trough contiguous, the lower run of the endless chain having sufficient slack to fold over the ends of the trough at the hinge.

25. An egg candling machine having a horizontal framing in two parts hinged together, an endless driving chain having its upper run passing through said framing and having rollers thereon with means to rotate the rollers, a source of light positioned in the framing to project light through the succession of rollers, an endless belt conveyor positioned at one end to one of the parts of the framing, said framing being foldable with one section extending over the other section and over the endless belt conveyor, said endless chain having sufficient slack to fold over the hinged connection of the framing.

26. An egg candling machine comprising in combination a frame structure having side members with a track structure, one portion of the structure being stationary and another portion being connected thereto by a transverse hinged connection, such hinge being at the upper portion of the frame structure, an endless chain passing through said side members and over the track structure, a drive for such chain operatively connected to the fixed portion of the frame structure, said chain having rollers to engage said tracks, a source of light positioned below the upper run of the rollers, the movable part of the frame being foldable over the fixed part, said chain having sufficient slack to fold over the hinged connection.

27. An egg candling machine as claimed in claim 26, the fixed portion of the frame structure being connected to a second fixed frame having an endless belt conveyor therein, said conveyor being at one end of the endless chain, the folded part of the frame structure extending over the second frame and over the endless belt having disconnectible posts supporting the free end of the upper section of the first frame when folded.

28. In an egg candling machine having an endless chain conveyor with a driven pulley therefor, a source of power having a drive pulley, a belt passing over the drive and the driven pulleys and engaged by a pair of idlers one engaging each run of the belt, a pivoted lever forming a mounting for said idlers, and a foot pedal to operate said lever to vary the pressure of the idlers on the belt.

In testimony whereof I have signed my name to this specification.

WILLIAM C. WYLAND.